(12) United States Patent
Lai et al.

(10) Patent No.: US 11,029,487 B2
(45) Date of Patent: Jun. 8, 2021

(54) OPTICAL LENS

(71) Applicant: RAYS OPTICS INC., Hukou Township (TW)

(72) Inventors: Sheng-Tang Lai, Hukou Township (TW); Hung-You Cheng, Hukou Township (TW); Kuo-Chuan Wang, Hukou Township (TW); Yuan-Hung Su, Hukou Township (TW)

(73) Assignee: RAYS OPTICS INC., Hsinchu County (TW)

( * ) Notice: Subject to any disclaimer, the term of this patent is extended or adjusted under 35 U.S.C. 154(b) by 297 days.

(21) Appl. No.: 16/029,308

(22) Filed: Jul. 6, 2018

(65) Prior Publication Data

US 2019/0302403 A1 Oct. 3, 2019

(30) Foreign Application Priority Data

Mar. 30, 2018 (TW) .................................. 107111161

(51) Int. Cl.
| G02B 3/00 | (2006.01) |
| G02B 9/08 | (2006.01) |
| G02B 13/14 | (2006.01) |
| G02B 9/12 | (2006.01) |
| G02B 13/18 | (2006.01) |

(52) U.S. Cl.
CPC ................. *G02B 9/08* (2013.01); *G02B 9/12* (2013.01); *G02B 13/14* (2013.01); *G02B 13/18* (2013.01)

(58) Field of Classification Search
CPC ........................................................ G02B 9/08
USPC ........................................................ 359/644
See application file for complete search history.

(56) References Cited

U.S. PATENT DOCUMENTS

| 7,436,605 | B2 | 10/2008 | Asami |
| 8,437,091 | B2 | 5/2013 | Hsu et al. |
| 8,922,917 | B2 | 12/2014 | Baba |
| 9,468,358 | B2 | 10/2016 | Harada |
| 2019/0369364 | A1* | 12/2019 | Shobayashi ............ G02B 13/04 |

* cited by examiner

*Primary Examiner* — James C. Jones
(74) *Attorney, Agent, or Firm* — Muncy, Geissler, Olds & Lowe, P.C.

(57) ABSTRACT

An optical lens includes a first lens group with a positive refractive power, a second lens group with a positive refractive power and an aperture stop. The first lens group and the second lens group are arranged in order from a first side to a second side, and the aperture stop is disposed between the first lens group and the second lens group. A total number of lenses with refractive powers in the optical lens is less than four, and the optical lens includes at least two lenses having an index of refraction of greater than 1.7.

20 Claims, 8 Drawing Sheets

OPTICAL LENS

BACKGROUND OF THE INVENTION a. Field of the Invention

The invention relates to an optical lens.

b. Description of the Related Art

Recent advances in technology have led to the development of various types of optical lenses. For example, an infrared lens for a 3D image sensor is a commonly used optical lens. Nowadays, there is a growing need for an optical lens to become thinner and have high optical performance. To meet these requirements, the optical lens needs to have low fabrication costs, large effective aperture, wide viewing angles and light weight. Therefore, it is desirable to provide an optical lens that may achieve lighter weight, lower fabrication costs and better imaging quality.

BRIEF SUMMARY OF THE INVENTION

According to one aspect of the present disclosure, an optical lens includes a first lens group with a positive refractive power, a second lens group with a positive refractive power and an aperture stop. The first lens group and the second lens group are arranged in order from a first side to a second side, and the aperture stop is disposed between the first lens group and the second lens group. A total number of lenses with refractive powers in the optical lens is less than four, and the optical lens includes at least two lenses having an index of refraction of greater than 1.7.

According to another aspect of the present disclosure, an optical lens includes a first lens group with a positive refractive power, a second lens group with a positive refractive power and an aperture stop. The first lens group and the second lens group are arranged in order from a magnified side to a minified side, and the aperture stop is disposed between the first lens group and the second lens group. The first lens group includes a first lens and a second lens with refractive powers, the second lens group includes a third lens with a refractive power, and the optical lens satisfies the conditions: 2.5<EFL<3.0 and −2.0<L1f/EFL<−1.4, where EFL is an effective focal length of the optical lens, and L1f is an effective focal length of the first lens.

According to another aspect of the present disclosure, an optical lens includes a first lens with a negative refractive power, a second lens with a positive refractive power, an aperture stop and a third lens with a positive refractive power arranged in order from a magnified side to a minified side. The optical lens satisfies the condition: 0.2<L3D/LT<0.45, where L3D is a diameter of a minified-side surface of the third lens, and LT is a distance along an optical axis between a magnified-side surface of the first lens and the minified-side surface of the third lens.

According to the above embodiments, an optical lens having lighter weight, lower fabrication costs and better imaging quality is provided.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 2 shows a ray fan plot, FIG. 3 illustrates astigmatic field curves and a percentage distortion curve.

FIG. 6 shows a ray fan plot, FIG. 7 illustrates astigmatic field curves and a percentage distortion curve.

DETAILED DESCRIPTION OF THE INVENTION

In the following detailed description of the preferred embodiments, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. Further, "First," "Second," etc, as used herein, are used as labels for nouns that they precede, and do not imply any type of ordering (e.g., spatial, temporal, logical, etc.).

The term "optical element" refers to an element made from at least in part a material that may refract, reflect, diffract, diffuse or filter at least a portion of the light passing through it. The material may include plastic or glass, and the optical element may be, for example, a lens, a prism or an aperture stop.

In an image-pickup system, a magnified side may refer to one side of an optical path of an optical lens comparatively near a subject to be picked-up, and a minified side may refer to other side of the optical path comparatively near a photosensor.

A certain region of a magnified side surface (or a minified side surface) of a lens may be convex or concave. Herein, a convex or concave region is more outwardly convex or inwardly concave in the direction of an optical axis as compared with other neighboring regions of the magnified/minified side surface.

Figure 1:
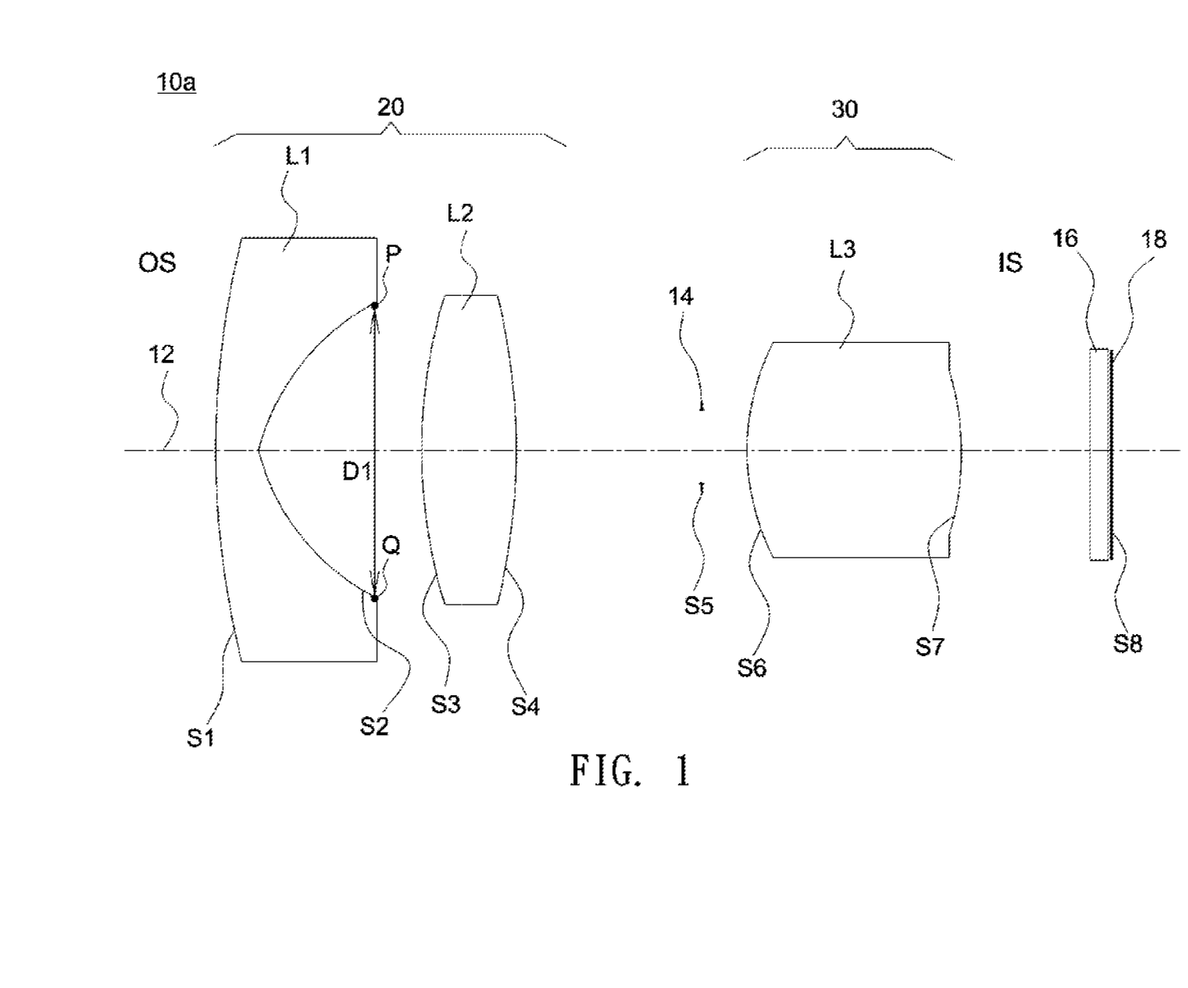
FIG. 1 shows a cross-sectional illustration of an optical lens according to an embodiment of the invention.

FIG. 1 shows a cross-sectional illustration of an optical lens according to an embodiment of the invention. As shown in FIG. 1, in this embodiment, the optical lens 10a has a lens barrel (not shown), and inside the lens barrel a first lens L1, a second lens L2, an aperture stop 14 and a third lens L3 are arranged in order from a first side (magnified side OS) to a second side (minified side IS). The first lens L1 and the second lens L2 form a first lens group 20 (such as a front lens group) with a positive refractive power, and the third lens forms a second lens group 30 (such as a rear lens group) with a positive refractive power. Further, the minified side IS may be disposed with a cover glass 16 and a photosensor (not shown), an image plane of the optical lens 10a formed at an effective focal length for 850 nm light is labeled as 18, and the cover glass 16 is disposed between the second lens group 30 and the image plane 18. In this embodiment, the refractive powers of the first lens L1 to the third lens L3 are negative, positive and positive, and the first lens L1 and the third lens L3 are aspheric glass lenses, but the invention is not limited thereto. In each of the following embodiments, the magnified side OS is located on the left side and the minified side IS is located on the right side of each figure, and thus this is not repeatedly described in the following for brevity.

The aperture stop 14 may be an independent component or integrally formed with other optical element. In this embodiment, the aperture stop may use a mechanic piece to block out peripheral light and transmit central light to achieve aperture effects. The mechanic piece may be adjusted by varying its position, shape or transmittance. In other embodiment, the aperture stop may be formed by applying an opaque or a light-absorbing material on a lens surface except for a central area to block out peripheral light and transmits central light.

A lens surface of each lens may be assigned a parameter of "diameter". For example, as shown in FIG. 1, a diameter D1 of a surface of the lens L1 facing the minified side IS is a distance between opposite turning points P and Q of the lens L1 measured in a direction perpendicular to the optical axis 12. Further, in this embodiment, a diameter of the surface S7 is 5.6 mm.

Detailed optical data and design parameters of the optical lens 10a are shown in Table 1 below. Note the data provided below are not used for limiting the invention, and those skilled in the art may suitably modify parameters or settings of the following embodiment with reference of the invention without departing from the scope or spirit of the invention.

TABLE 1

F/# = 1.8; EFL = 2.76 (mm)
TTL = 23.2 (mm); LT = 19.6 (mm)

| surface | radius of curvature (mm) | interval (mm) | refractive index | Abbe number | object description |
|---|---|---|---|---|---|
| S1* | 9.51 | 1.28 | 1.80 | 40.7 | L1(meniscus) |
| S2* | 2.44 | 4.30 | | | |
| S3 | 18.14 | 2.39 | 2.00 | 19.3 | L2(biconvex) |
| S4 | −15.17 | 3.93 | | | |
| S5 | INF | 2.18 | | | aperture stop |
| S6* | 6.59 | 5.47 | 1.80 | 40.7 | L3(biconvex) |
| S7* | −8.34 | 0.10 | | | |
| S8 | INF | | | | image plane |

In the above Table 1, the field heading "interval" represents a distance between two adjacent surfaces along the optical axis 12 of the optical lens 10a. For example, an interval of the surface S1 is a distance between the surface S1 and the surface S2 along the optical axis 12. Further, the interval, refractive index and Abbe number of any lens listed in the column of "Object description" show values in a horizontal row aligned with the position of that lens. Moreover, in table 1, the surfaces S1 and S2 are two lens surfaces of the first lens L1, the surfaces S3 and S4 are two lens surfaces of the second lens L2, and the surfaces S6 and S7 are two lens surfaces of the third lens L3. The aperture stop 14 is designated by the surface S5, and the image plane 18 of the optical lens 10a is designated by the surface S8.

In the above table, the surface denoted by an asterisk is an aspheric surface, and a surface without the denotation of an asterisk is a spherical surface.

In the following design examples of the invention, each aspheric surface satisfies the following equation:

$$Z = \frac{cr^2}{1 + \sqrt{1 - (1 + k)c^2 r^2}} + \sum_{i=1}^{N} \alpha_i r^i,$$

where Z denotes a sag of an aspheric surface along the optical axis 12, c denotes a reciprocal of a radius of an osculating sphere, K denotes a conic constant, r denotes a height of the aspheric surface measured in a direction perpendicular to the optical axis 12, and $\alpha_i$ denotes aspheric coefficients of each order. Table 2 lists aspheric coefficients and conic constant of each aspheric surface of the optical lens 10a in this embodiment.

TABLE 2

| surface | K | $\alpha_4$ | $\alpha_6$ | $\alpha_8$ |
|---|---|---|---|---|
| S1* | −3.97 | −9.92E−04 | 1.42E−05 | −1.03E−07 |
| S2* | −0.99 | −2.25E−05 | −1.06E−04 | 1.97E−06 |
| S6* | −7.58 | 2.80E−03 | −8.42E−05 | 2.41E−06 |
| S7* | 0 | 3.51E−03 | 6.95E−06 | 4.47E−06 |

The radius of curvature is a reciprocal of the curvature. When a lens surface has a positive radius of curvature, the center of the lens surface is located towards the minified side. When a lens surface has a negative radius of curvature, the center of the lens surface is located towards the magnified side. The concavity and convexity of each lens surface is listed in the above table and shown in corresponding figures.

The Symbol F/# shown in the above table is an aperture value of the aperture stop. When the optical lens is used in an optical projection system, the image plane is provided on a light valve, and, when the optical lens is used in an image pick-up system, the image plane is a sensing surface of a photosensor.

A total lens length of the optical lens is denoted as "LT" in the above table. Specifically, the total lens length LT is a distance along the optical axis 12 between the surface S1 closest to the magnified side (magnified-side surface of the first lens L1) and the surface S7 closest to the minified side (minified-side surface of the third lens L3), as shown in Table 1.

A total track length of the optical lens is denoted as "TTL" in the above table. Specifically, the total track length TTL is a distance along the optical axis 12 between the surface S1 closest to the magnified side (magnified-side surface of the first lens L1) and the image plane S8, as shown in Table 1.

In this embodiment, an effective focal length of the first lens group (front lens group) is 108.48 mm, an effective focal length of the second lens group (rear lens group) is 5.57 mm, and an effective focal length of the first lens (denoted as L1f) is −4.52 mm.

Figure 2:
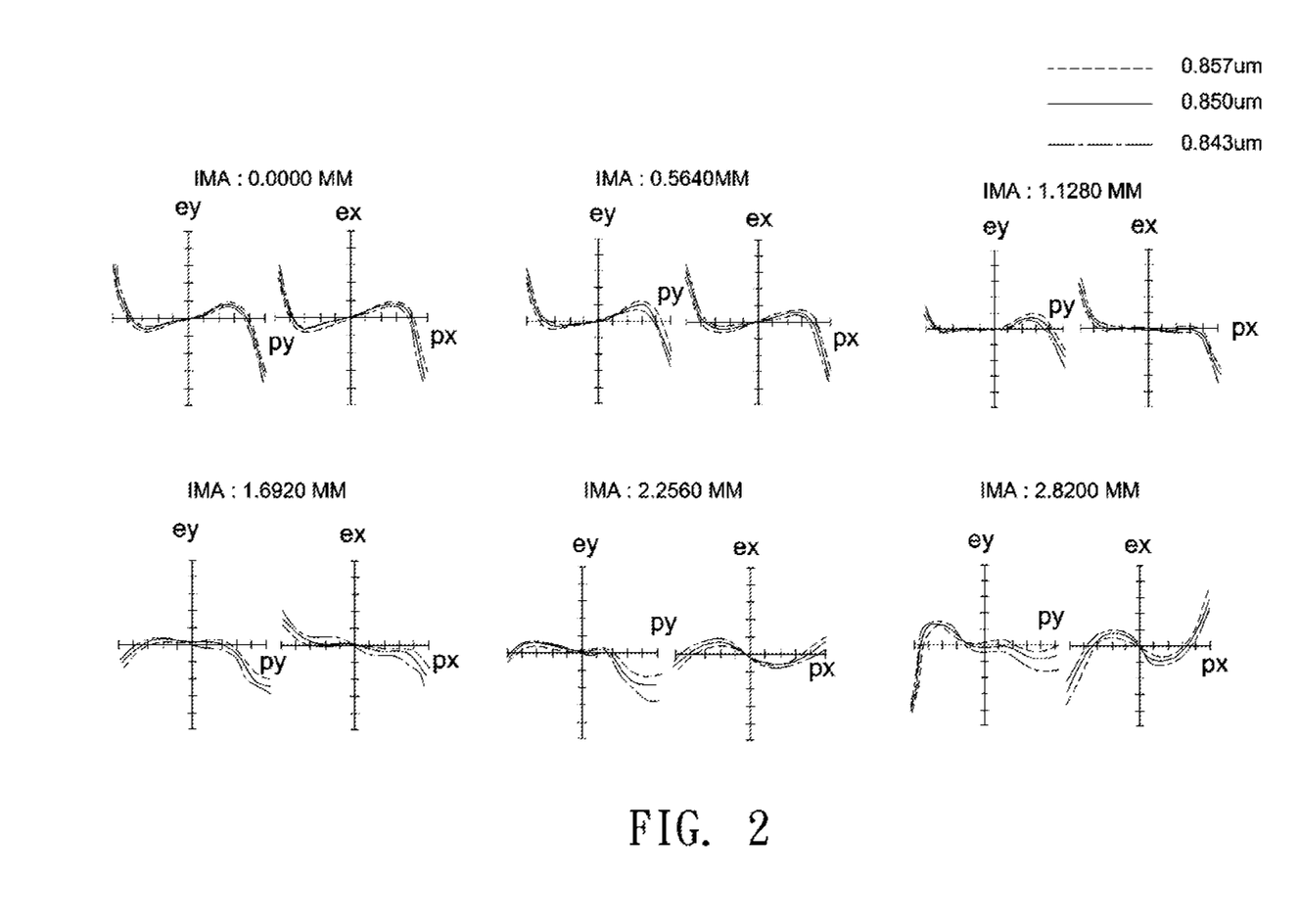
Figure 3:
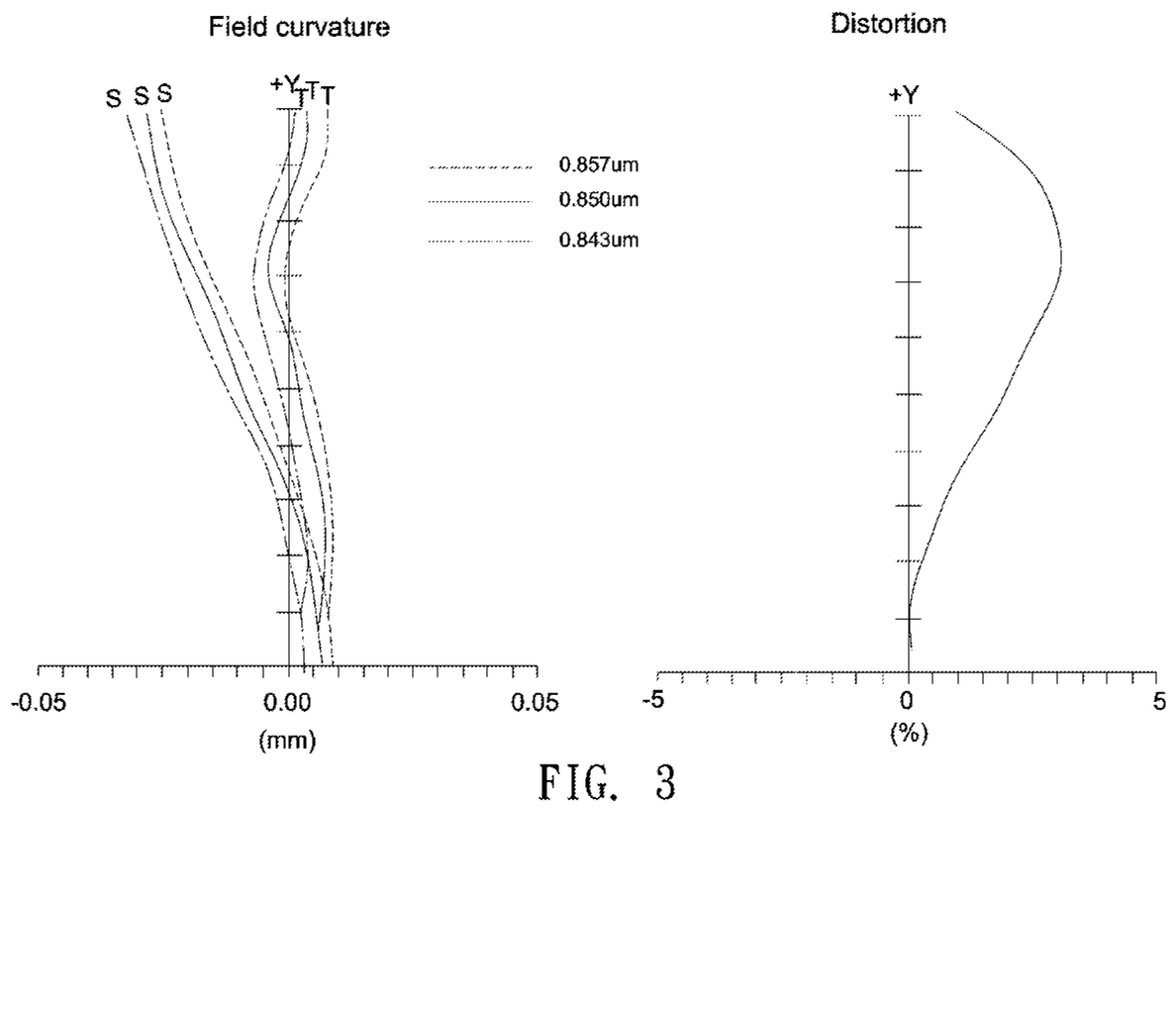
Figure 4:
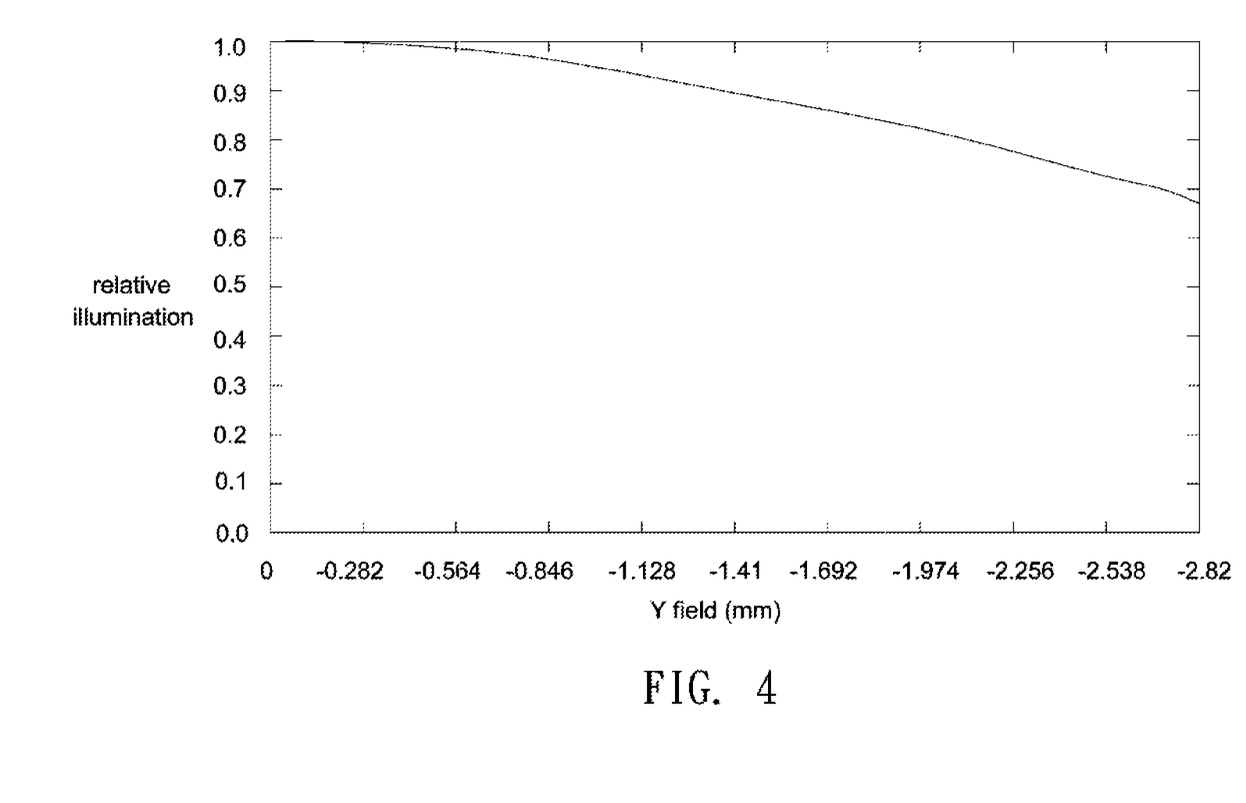
FIG. 4 shows a relative illumination plot of the optical lens shown in FIG. 1.

FIGS. 2-4 show optical simulation results of the optical lens 10a shown in FIG. 1. FIG. 2 shows a ray fan plot for infrared light of the optical lens 10a, where an abscissa of the plot represents entrance pupil positions, and an ordinate of the plot represents relative numerical values of positions on an image plane (such as the image plane 18) where main light beams are projected. FIG. 3 illustrates astigmatic field curves and a percentage distortion curve. In the astigmatic field curves, the abscissa represents a distance relative to a focal plane, and the ordinate represents the magnitude of the field (from 0 to the maximum field). In the percentage distortion curve, the abscissa represents the percentage of distortion, and the ordinate represents the magnitude of the field (from 0 to the maximum field). FIG. 4 shows a relative illumination plot of the optical lens 10a. The simulated results shown in FIGS. 2-4 are within permitted ranges specified by the standard, which indicates the above embodiment of the optical lens 10a may achieve good imaging quality and optical performance.

In one embodiment, the optical lens may include two lens groups, and the front lens group may include a lens with a negative refractive power (such as the first lens L1) and a lens with a positive refractive power (such as the second lens L2) to increase light collection efficiency, but the invention is not limited thereto. An F-number of the optical lens may be smaller than or equal to 2.2. The rear lens group may have an aspheric lens (such as the third lens L3) to correct for aberrations. A total number of lenses with refractive powers in the optical lens may be less than four. In one embodiment, the optical lens may include at least two lenses that have an index of refraction of greater than 1.7. In one embodiment, the optical lens may include at least two lenses that have an Abber number of smaller than 50.

In one embodiment, the optical lens may satisfy a condition of 2.5<EFL<3.0, a further condition of 2.6<EFL<2.9, and a still further condition of 2.65<EFL<2.85, where EFL is an effective focal length of the optical lens. Besides, the optical lens may satisfy a condition of −2.0<L1$f$/EFL<−1.4, a further condition of −1.95<L1$f$/EFL<−1.5, and a still further condition of −1.9<L1$f$/EFL<−1.6, where L1$f$ is an effective focal length of the first lens L1. Meeting the above conditions may facilitate light converging capability of lenses to thus allow for better optical performance in a limited space.

In one embodiment, the optical lens may satisfy a condition of 0.2<L3D/LT<0.45, a further condition of 0.23<L3D/LT<0.43, and a still further condition of 0.26<L3D/LT<0.42, where L3D is a diameter of a surface of the third lens L3 facing the minified side IS (the second side), LT is a distance along the optical axis 12 between the magnified-side surface S1 of the first lens L1 (the lens closest to the magnified side OS) and the minified-side surface S7 of the third lens L3 (the lens closest to the minified side IS). Meeting the above conditions may ensure that light beams focused by lenses form an image on the photosensor and thus achieve better optical performance in a limited space.

Figure 5:
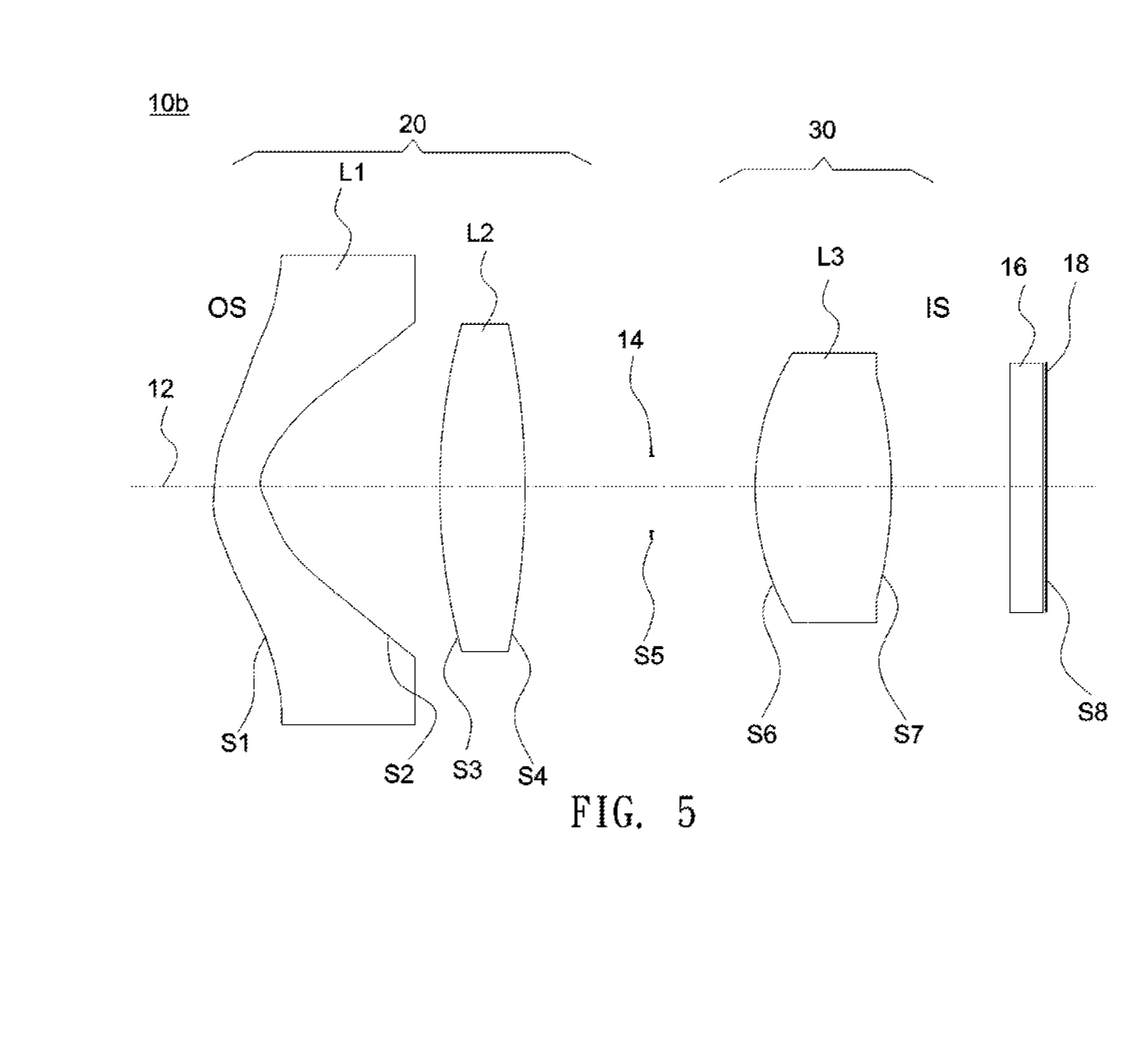
FIG. 5 shows a cross-sectional illustration of an optical lens according to another embodiment of the invention.

FIG. 5 shows a cross-sectional illustration of an optical lens 10$b$ according to a second embodiment of the invention. In this embodiment, the refractive powers of the first lens L1 to the third lens L3 are negative, positive and positive, all the lenses L1-L3 are made from glass, and the first lens L1 and the third lens L3 are aspheric lenses. In this embodiment, the aspheric lenses are made from glass molding. Further, in this embodiment, a diameter of the surface S7 is 6.08 mm. Detailed optical data and design parameters of the optical lens 10$b$ are shown in Table 3 below.

TABLE 3

F/# = 1.84; EFL = 2.73 (mm)
TTL = 18.8(mm); LT = 15.5(mm)

| surface | radius of curvature (mm) | interval (mm) | refractive index | Abbe number | object description |
|---|---|---|---|---|---|
| S1* | 3.38 | 1.13 | 1.81 | 40.3 | L1(meniscus) |
| S2* | 1.53 | 4.06 | | | |
| S3 | 13.79 | 1.96 | 2.10 | 17.0 | L2(biconvex) |
| S4 | −16.00 | 2.93 | | | |
| S5 | | 2.38 | | | aperture stop |
| S6* | 6.15 | 3.00 | 1.81 | 40.3 | L3(biconvex) |
| S7* | −7.07 | 2.60 | | | |
| S8 | INF | | | | image plane |

Table 4 lists aspheric coefficients and conic constant of each aspheric surface of the optical lens 10$b$ according to the second embodiment of the invention.

TABLE 4

| surface | K | $\alpha_4$ | $\alpha_6$ | $\alpha_8$ | $\alpha_{10}$ | $\alpha_{12}$ | $\alpha_{14}$ |
|---|---|---|---|---|---|---|---|
| S1* | −2.98E+00 | 1.66E−05 | −2.66E−04 | 2.17E−05 | −8.78E−07 | 1.85E−08 | −1.63E−10 |
| S2* | −1.91E+00 | 2.28E−02 | −3.99E−03 | 4.27E−04 | −2.88E−05 | 1.12E−06 | −1.92E−08 |
| S6* | −1.63E+00 | 1.29E−04 | 1.70E−04 | −2.84E−05 | 3.73E−06 | −2.30E−07 | 5.43E−09 |
| S7* | −1.13E+01 | 3.12E−04 | 1.70E−04 | 1.51E−05 | −6.23E−06 | 7.39E−07 | −2.85E−08 |

In this embodiment, an effective focal length of the first lens group (front lens group) is 24.83 mm, an effective focal length of the second lens group (rear lens group) is 4.63 mm, and an effective focal length of the first lens (denoted as L1$f$) is −4.87 mm.

Figure 6:
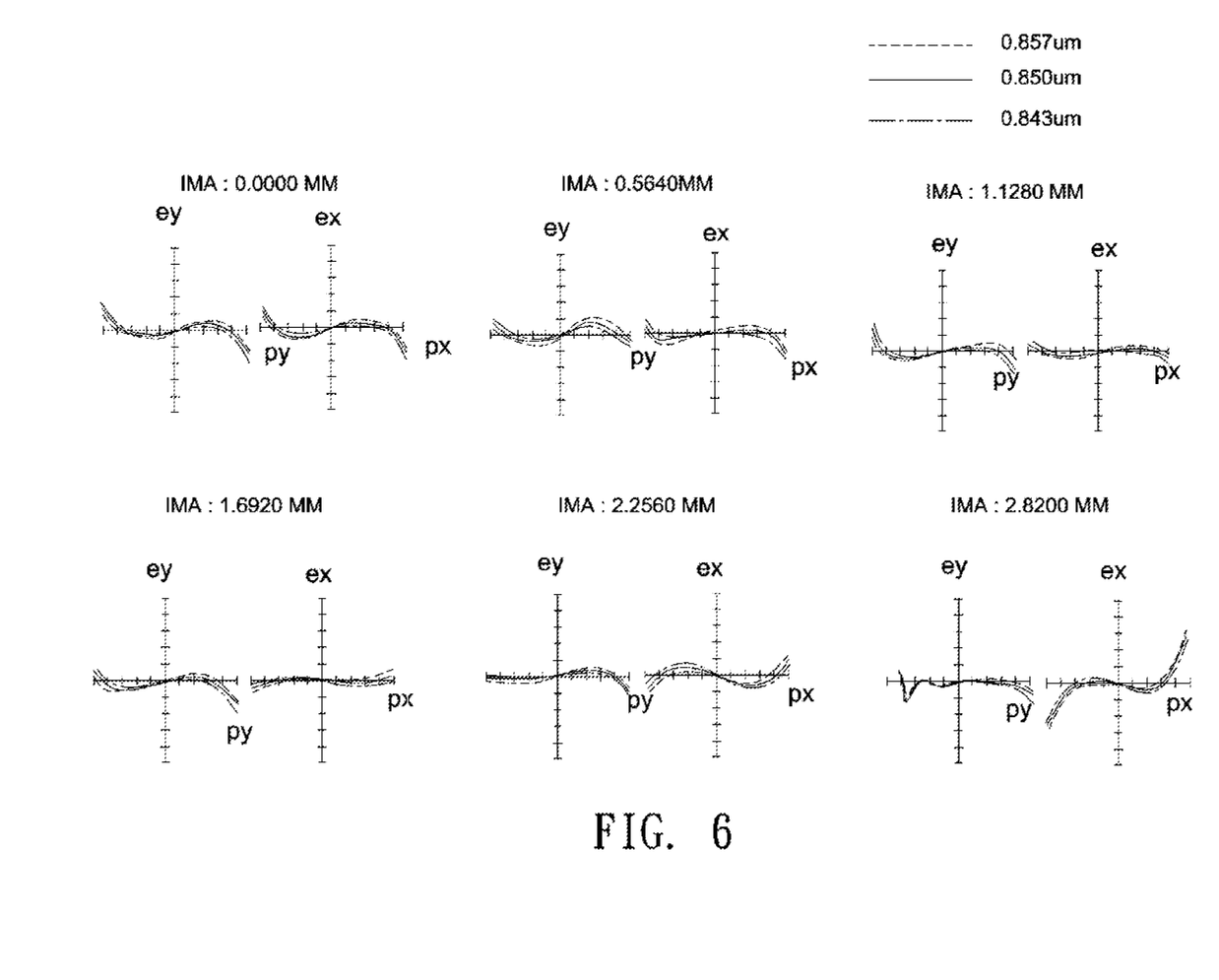
Figure 7:
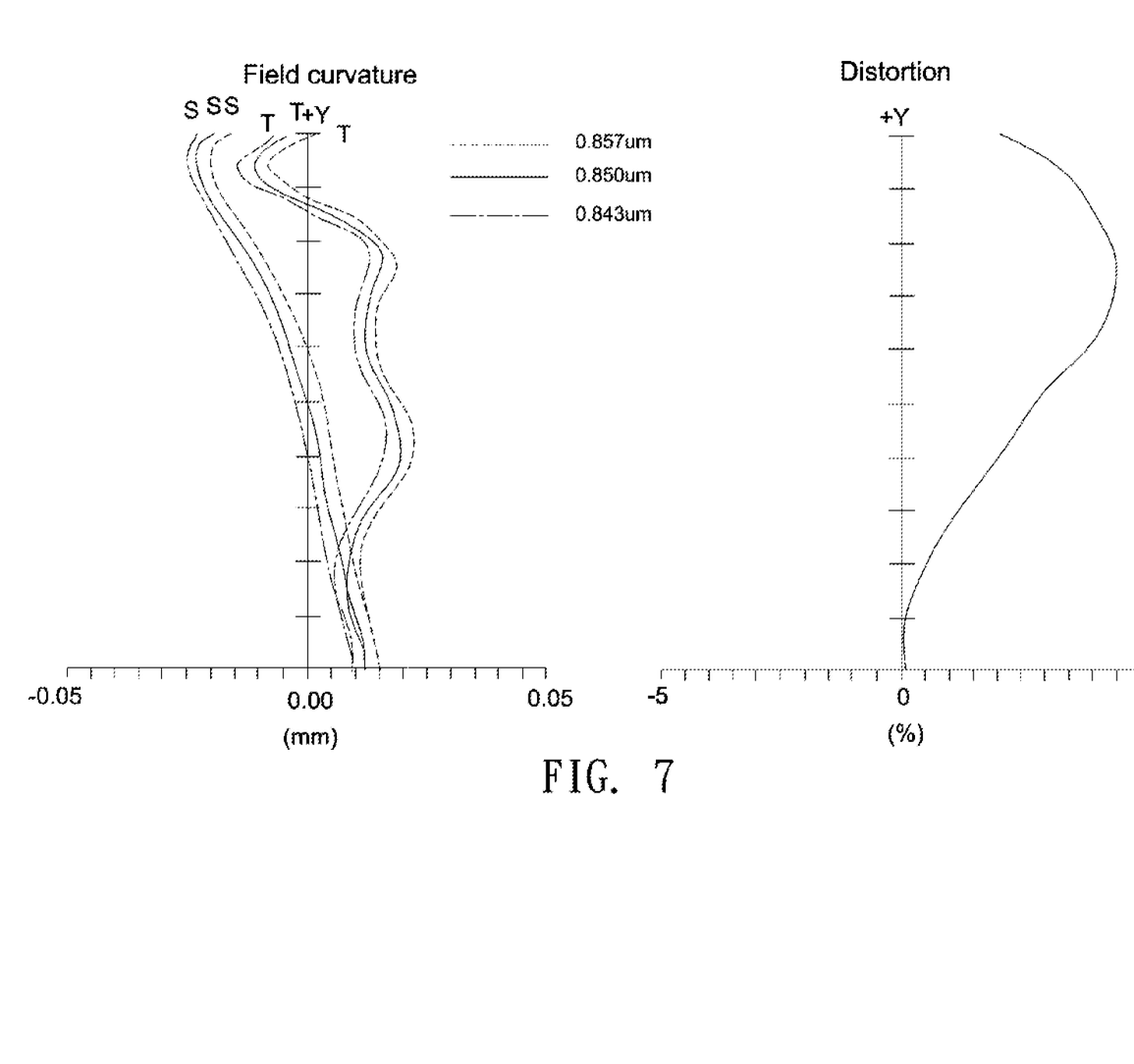
Figure 8:
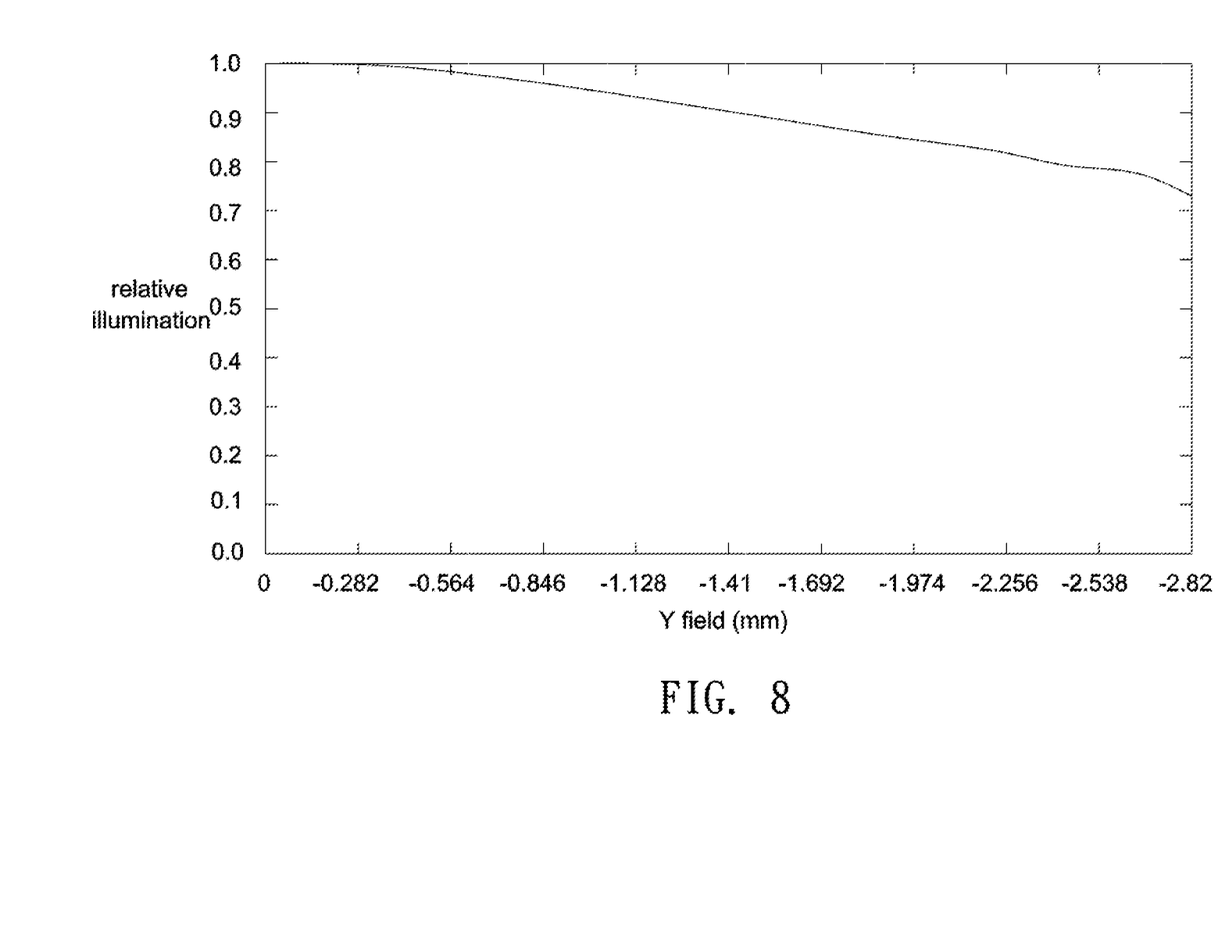
FIG. 8 shows a relative illumination plot of the optical lens shown in FIG. 5.

FIGS. 6-8 show optical simulation results of the optical lens 10$b$ shown in FIG. 5. FIG. 6 shows a ray fan plot for infrared light of the optical lens 10$b$, where an abscissa of the plot represents entrance pupil positions, and an ordinate of the plot represents relative numerical values of positions on an image plane (such as the image plane 18) where main light beams are projected. FIG. 7 illustrates astigmatic field curves and a percentage distortion curve. In the astigmatic field curves, the abscissa represents a distance relative to a focal plane, and the ordinate represents the magnitude of the field (from 0 to the maximum field). In the percentage distortion curve, the abscissa represents the percentage of distortion, and the ordinate represents the magnitude of the field (from 0 to the maximum field). FIG. 8 shows a relative illumination plot of the optical lens 10$b$. The simulated results shown in FIGS. 6-8 are within permitted ranges specified by the standard, which indicates the above embodiment of the optical lens 10$b$ may achieve good imaging quality and optical performance.

According to the above embodiments, the optical lenses 10$a$ and 10$b$ may be used in a 3D image sensor and operated at a wavelength of light of 850 nm, and the optical lenses 10$a$ and 10$b$ may achieve lighter weight, lower fabrication costs and better imaging quality in a limited layout space.

Though the embodiments of the invention and design parameters in the tables have been presented for purposes of illustration and description, they are not intended to be exhaustive or to limit the invention. Accordingly, many modifications and variations without departing from the spirit of the invention or essential characteristics thereof will be apparent to practitioners skilled in this art. For example, the number of all lenses of each lens group or optical parameters such as refractive power for each lens may be changed, or a lens without affecting the overall optical performance may be additionally provided. It is intended that the scope of the invention be defined by the claims appended hereto and their equivalents in which all terms are meant in their broadest reasonable sense unless otherwise indicated.

What is claimed is:

1. An optical lens, comprising:
    a first lens group with a positive refractive power and a second lens group with a positive refractive power arranged in order from a first side to a second side; and
    an aperture stop disposed between the first lens group and the second lens group, a total number of lenses with refractive powers in the optical lens being less than four, at least two lenses of the optical lens having an Abbe number of smaller than 50, and the optical lens comprising at least two lenses having an index of refraction of greater than 1.7.

2. The optical lens as claimed in claim 1, wherein the first lens group comprises a first lens and a second lens with refractive powers, the second lens group comprises a third lens with a refractive power, and the optical lens satisfies one of the following conditions:
    (1) the first lens is a meniscus lens, the second lens is a bi-convex lens, and the third lens is a bi-convex lens;
    (2) the first lens is an aspheric lens, the second lens is a spherical lens, and the third lens is an aspheric lens.

3. The optical lens as claimed in claim 1, wherein the optical lens satisfies one of the following conditions:
    (1) the optical lens has an aspheric lens between the first side and the aperture stop;
    (2) the optical lens has only one aspheric lens between the aperture stop and the second side;
    (3) all lenses of the optical lens are made from glass.

4. The optical lens as claimed in claim 1, wherein an F-number of the optical lens is smaller than or equal to 2.2.

5. The optical lens as claimed in claim 1, wherein a total lens length of the optical lens is smaller than 20 mm.

6. The optical lens as claimed in claim 1, wherein a total track length of the optical lens is in the range of 20 to 40 mm.

7. An optical lens, comprising:
    a first lens group with a positive refractive power and a second lens group with a positive refractive power arranged in order from a magnified side to a minified side; and
    an aperture stop disposed between the first lens group and the second lens group, wherein the first lens group comprises a first lens and a second lens with refractive powers, the second lens group comprises a third lens with a refractive power, and the optical lens satisfies the conditions:
    2.5 mm<EFL <3.0 mm and −2.0<L1$f$/EFL <−1.4, where EFL is an effective focal length of the optical lens, and L1$f$ is an effective focal length of the first lens.

8. The optical lens as claimed in claim 7, wherein at least two lenses of the optical lens have an Abbe number of smaller than 50.

9. The optical lens as claimed in claim 7, wherein the optical lens satisfies one of the following conditions:
    (1) the optical lens has an aspheric lens between the magnified side and the aperture stop;
    (2) the optical lens has only one aspheric lens between the aperture stop and the minified side;
    (3) all lenses of the optical lens are made from glass.

10. The optical lens as claimed in claim 7, wherein an F-number of the optical lens is smaller than or equal to 2.2.

11. The optical lens as claimed in claim 7, wherein a total lens length of the optical lens is smaller than 20 mm.

12. The optical lens as claimed in claim 7, wherein a total track length of the optical lens is in the range of 20 to 40 mm.

13. The optical lens as claimed in claim 7, wherein the optical lens satisfies one of the following conditions:
    (1) the first lens is a meniscus lens, the second lens is a bi-convex lens, and the third lens is a bi-convex lens;
    (2) the first lens is an aspheric lens, the second lens is a spherical lens, and the third lens is an aspheric lens.

14. An optical lens, comprising:
    a first lens group with a positive refractive power and a second lens group with a positive refractive power arranged in order from a magnified side to a minified side; and
    an aperture stop disposed between the first lens group and the second lens group, and the optical lens comprising at least two lenses having an index of refraction of greater than 1.7, wherein the first lens group comprises a first lens with a negative refractive power and a second lens with a positive refractive power, the second lens group comprises a third lens with a positive refractive power, and the optical lens satisfies the condition:
    0.2<L3D/LT<0.45, where L3D is a diameter of a minified-side surface of the third lens, and LT is a total lens length that is a distance along an optical axis between a magnified-side surface of the first lens and the minified-side surface of the third lens, and wherein the optical lens satisfies one of the following conditions:
    (1) the first lens is a meniscus lens, the second lens is a bi-convex lens, and the third lens is a bi-convex lens;
    (2) the first lens is an aspheric lens, the second lens is a spherical lens, and the third lens is an aspheric lens.

15. The optical lens as claimed in claim 14, wherein at least two lenses of the optical lens have an Abbe number of smaller than 50.

16. The optical lens as claimed in claim 14, wherein the optical lens satisfies one of the following conditions:
    (1) the optical lens has an aspheric lens between the magnified side and the aperture stop;
    (2) the optical lens has only one aspheric lens between the aperture stop and the minified side;
    (3) all lenses of the optical lens are made from glass.

17. The optical lens as claimed in claim 14, wherein an F-number of the optical lens is smaller than or equal to 2.2.

18. The optical lens as claimed in claim 14, wherein the total lens length LT of the optical lens is smaller than 20 mm.

19. The optical lens as claimed in claim 14, wherein a total track length of the optical lens is in the range of 20 to 40 mm.

20. The optical lens as claimed in claim 14,
    wherein the optical lens satisfies the conditions:
    2.5 mm<EFL <3.0 mm and −2.0<L1$f$/EFL <−1.4, where EFL is an effective focal length of the optical lens, and L1$f$ is an effective focal length of the first lens.

* * * * *